(12) United States Patent
Jung et al.

(10) Patent No.: US 11,575,529 B2
(45) Date of Patent: Feb. 7, 2023

(54) METHOD, SYSTEM, AND NON-TRANSITORY COMPUTER READABLE RECORD MEDIUM FOR CONTROLLING JOINING CHATROOM BASED ON LOCATION

(71) Applicant: LINE Plus Corporation, Seongnam-si (KR)

(72) Inventors: Chaewon Jung, Seongnam-si (KR);
Sungwhan Kim, Seongnam-si (KR);
Hyun Jung Lee, Seongnam-si (KR);
Seo Hyun Cho, Seongnam-si (KR);
Eun Jung Joung, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 112 days.

(21) Appl. No.: 15/931,039

(22) Filed: May 13, 2020

(65) Prior Publication Data
US 2020/0366509 A1  Nov. 19, 2020

(30) Foreign Application Priority Data
May 14, 2019  (KR) ........................ 10-2019-0056155

(51) Int. Cl.
*H04L 12/18* (2006.01)
*H04L 67/52* (2022.01)
*H04L 51/04* (2022.01)

(52) U.S. Cl.
CPC .......... *H04L 12/1822* (2013.01); *H04L 67/52* (2022.05); *H04L 51/04* (2013.01)

(58) Field of Classification Search
CPC ..... H04L 12/1822; H04L 67/18; H04L 51/04; H04L 67/52
See application file for complete search history.

(56) References Cited

U.S. PATENT DOCUMENTS

| | | | |
|---|---|---|---|
| 8,548,503 B2* | 10/2013 | Oh ......................... | H04L 51/04 455/456.3 |
| 9,565,531 B2* | 2/2017 | Jack ....................... | H04W 4/18 |
| 9,906,481 B2* | 2/2018 | Bender ............ | G06F 16/90335 |
| 2006/0046743 A1* | 3/2006 | Mirho ..................... | H04L 67/18 455/456.3 |
| 2009/0254840 A1* | 10/2009 | Churchill .............. | G06F 3/0481 715/753 |
| 2015/0245168 A1* | 8/2015 | Martin .................. | G06Q 50/01 715/751 |

(Continued)

FOREIGN PATENT DOCUMENTS

KR  10-2002-0074304 A  9/2002

*Primary Examiner* — Nam T Tran
(74) *Attorney, Agent, or Firm* — Sughrue Mion, PLLC

(57) ABSTRACT

Provided are a method, a system, and a non-transitory computer readable record medium for controlling joining a chatroom based on a location. The method may include identifying a first location of an electronic device at a first point in time; displaying a chatroom that uses a user location as a chatroom joining condition, and that allows a user of an electronic device to join based on the first location of the electronic device; and in response to a join request being input at a second point in time from the user to join the displayed chatroom, determining whether to allow the user to join the chatroom based on a second location of the electronic device at the second point in time at which the join request is input.

19 Claims, 12 Drawing Sheets

(56) References Cited

U.S. PATENT DOCUMENTS

2015/0264006 A1* 9/2015 Parra ................... H04L 67/18
  709/206
2017/0041263 A1* 2/2017 Shekel ............... H04L 63/0414

* cited by examiner

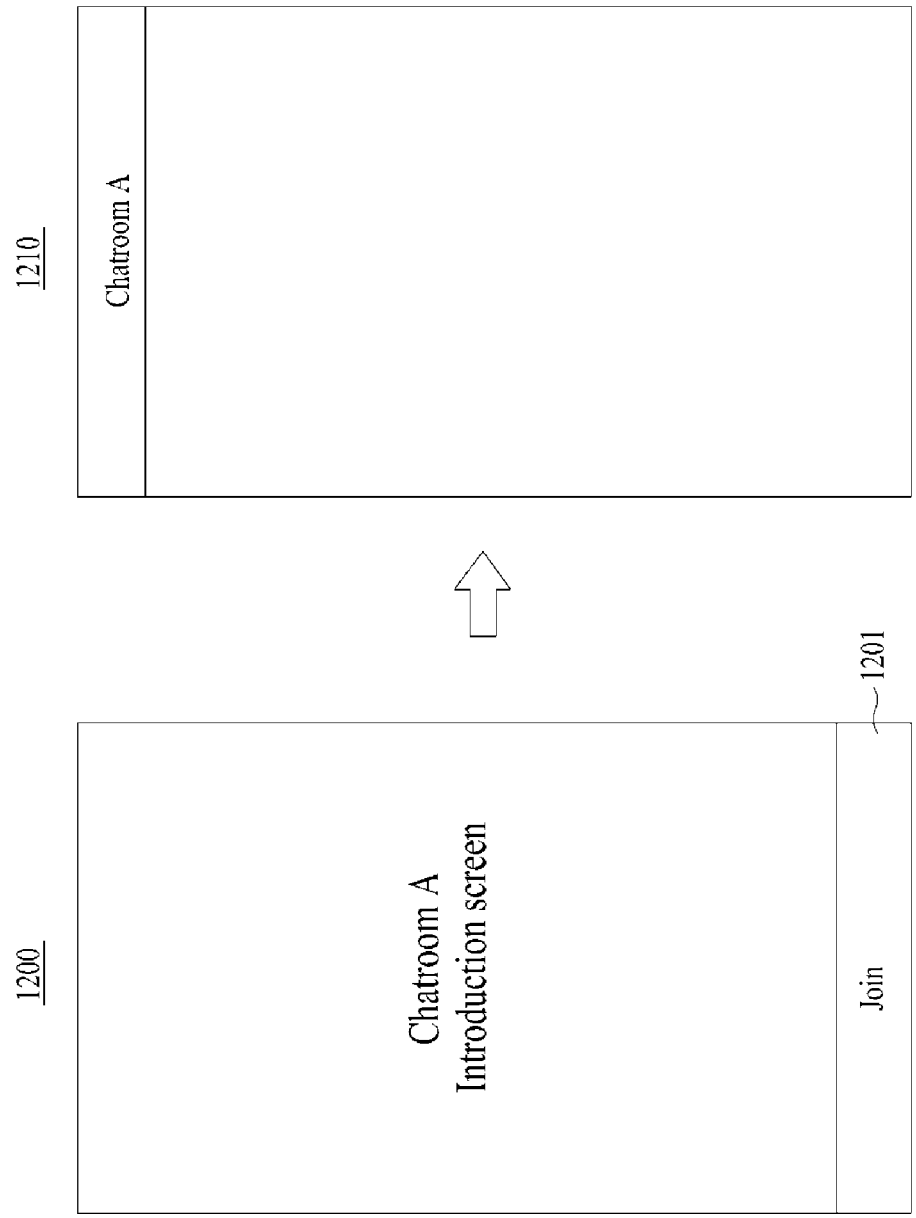

METHOD, SYSTEM, AND NON-TRANSITORY COMPUTER READABLE RECORD MEDIUM FOR CONTROLLING JOINING CHATROOM BASED ON LOCATION

CROSS-REFERENCE TO RELATED APPLICATION

This application claims priority to Korean Patent Application No. 10-2019-0056155, filed May 14, 2019 in the Korean Intellectual Property Office (KIPO), the disclosure of which is incorporated herein by reference in its entirety.

BACKGROUND

1. Field

Apparatuses and methods consistent with example embodiments relate to allowing or denying access to an open chatroom based on a location.

2. Description of Related Art

An instant messenger refers to a communication tool using software capable of sending and receiving messages or data in real time. A user may register a contact on a messenger and may exchange messages with a counterpart included in a contact list in real time.

Such a messenger function is popular in a mobile environment of a mobile communication terminal as well as a personal computer (PC).

With the increasing popularity of an instant messenger and diversity of functions provided through the instant messenger, an open chat function that enables a direct chat using a link without adding a friend using a telephone number or an identifier (ID) is available.

SUMMARY

One or more example embodiments provide a method and an apparatus for creating an open chatroom by designating location information as a joining condition and may control joining the open chatroom based on a location.

According to an aspect of an example embodiment, there is provided a method of controlling chatroom access, including: identifying a first location of an electronic device at a first point in time; displaying a chatroom that uses a user location as a chatroom joining condition, and that allows a user of the electronic device to join based on the first location of the electronic device; and in response to a join request being input at a second point in time from the user to join the displayed chatroom, determining whether to allow the user to join the chatroom based on a second location of the electronic device at the second point in time at which the join request is input.

The method may further include: setting the chatroom joining condition based on a user input for selecting a point of interest (POI) or a region or interest (ROI).

The chatroom may be an open chatroom accessible through a link.

The displaying the chatroom may include: determining the chatroom that allows the user to join by comparing an accessible location designated for the chatroom, with the first location of the electronic device.

The displaying the chatroom may include: displaying the chatroom that allows the user to join in a form of a list based on the first location of the electronic device.

The displaying the chatroom may include: displaying, on a map that includes the first location of the electronic device, an icon of the chatroom that allows the user to join.

The chatroom joining condition may be satisfied when the electronic device is located within a predetermined distance from an accessible location that is designated for the chatroom. The displaying the chatroom may include: displaying the chatroom as a first icon type when the electronic device is located within the predetermined distance from the accessible location designated for the chatroom; and displaying the chatroom as a second icon type that is different from the first icon type when the electronic device is located outside the predetermined distance from the accessible location designated for the chatroom.

The method may further include: receiving an input for setting the chatroom joining condition by designating an accessible location for the chatroom, and wherein the displaying the chatroom may include: displaying the chatroom when the first location of the electronic device corresponds to the accessible location designated for the chatroom.

The determining whether to allow the user to join the chatroom may include: determining to allow the user to join the chatroom, in response to determining that the second location of the electronic device at the second point in time at which the join request is input is within a predetermined distance from an accessible location that is designated for the chatroom as the chatroom joining condition; and determining to disallow the user to join the chatroom, in response to determining that the second location is outside the predetermined distance from the accessible location that is designated for the chatroom.

The method may further include: in response to determining that the first location of the electronic device changes to the second location different from the first location, determining whether to remove the user from the chatroom based on the second location of the electronic device and a location-based user removal condition that is preset for the chatroom.

The determining whether to allow the user to join the chatroom may include: allowing the user to join the chatroom based on the second location of the electronic device at the second point in time at which the join request is input; tracking a current location of the electronic device after the user joins the chatroom; and determining to remove the user from the chatroom in response to a result of the tracking satisfying the location-based user removal condition.

According to an aspect of at least one example embodiment, there is provided a non-transitory computer-readable record medium storing instructions that, when executed by a processor, cause the processor to perform the method of controlling the chatroom access.

According to an aspect of another example embodiment, there is provided a computer system including: at least one memory configured to store computer-readable instructions; and at least one processor configured to execute the computer-readable instructions stored in the memory, to: identify a first location of the computer system at a first point in time; display a chatroom that uses a user location as a chatroom joining condition and allows a user of the computer system to join based on the first location of the computer system; and in response to a join request being input from the user, at a second point in time, to join the displayed chatroom, determine whether to allow the user to join the chatroom based on a second location of the computer system at the second point in time at which the join request is input.

The at least one processor may be further configured to execute the computer-readable instructions to: set the chatroom joining condition based on a user input for selecting a point of interest (POI) or a region of interest (ROI).

The chatroom may be an open chatroom accessible through a link.

The at least one processor may be further configured to execute the computer-readable instructions to: determine the chatroom that allows the user to join by comparing an accessible location designated for the chatroom, with the first location of the computer system.

The at least one processor may be further configured to execute the computer-readable instructions to: display, on a map that includes the first location of the computer system, an icon of the chatroom that allows the user to join.

The chatroom joining condition may be satisfied when the computer system is located within a predetermined distance from an accessible location that is designated for the chatroom. The at least one processor may be further configured to execute the computer-readable instructions to: display the chatroom as a first icon type when the computer system is located within the predetermined distance from the accessible location designated for the chatroom; and display the chatroom as a second icon type that is different from the first icon type when the computer system is located outside the predetermined distance from the accessible location designated for the chatroom.

The at least one processor may be further configured to execute the computer-readable instructions to: determine to allow the user to join the chatroom, in response to determining that the second location of the computer system at the second point in time at which the join request is input is within a predetermined distance from an accessible location that is designated for the chatroom as the chatroom joining condition; and determine to disallow the user to join the chatroom, in response to determining that the second location is outside the predetermined distance from the accessible location that is designated for the chatroom.

The at least one processor may be further configured to execute the computer-readable instructions to: allow the user to join the chatroom based on the second location of the computer system at the second point in time at which the join request is input; track a current location of the computer system after the user joins the chatroom; and determine whether to remove the user from the chatroom, in response to a result of tracking the current location of the computer system satisfying a location-based user withdrawal condition that is preset for the chatroom.

BRIEF DESCRIPTION OF THE FIGURES

The above and/or other aspects will be more apparent by describing certain example embodiments, with reference to the accompanying drawings, in which:

FIG. 12 illustrates an example of a process of joining a chatroom according to at least one example embodiment.

DETAILED DESCRIPTION

Figure 1:
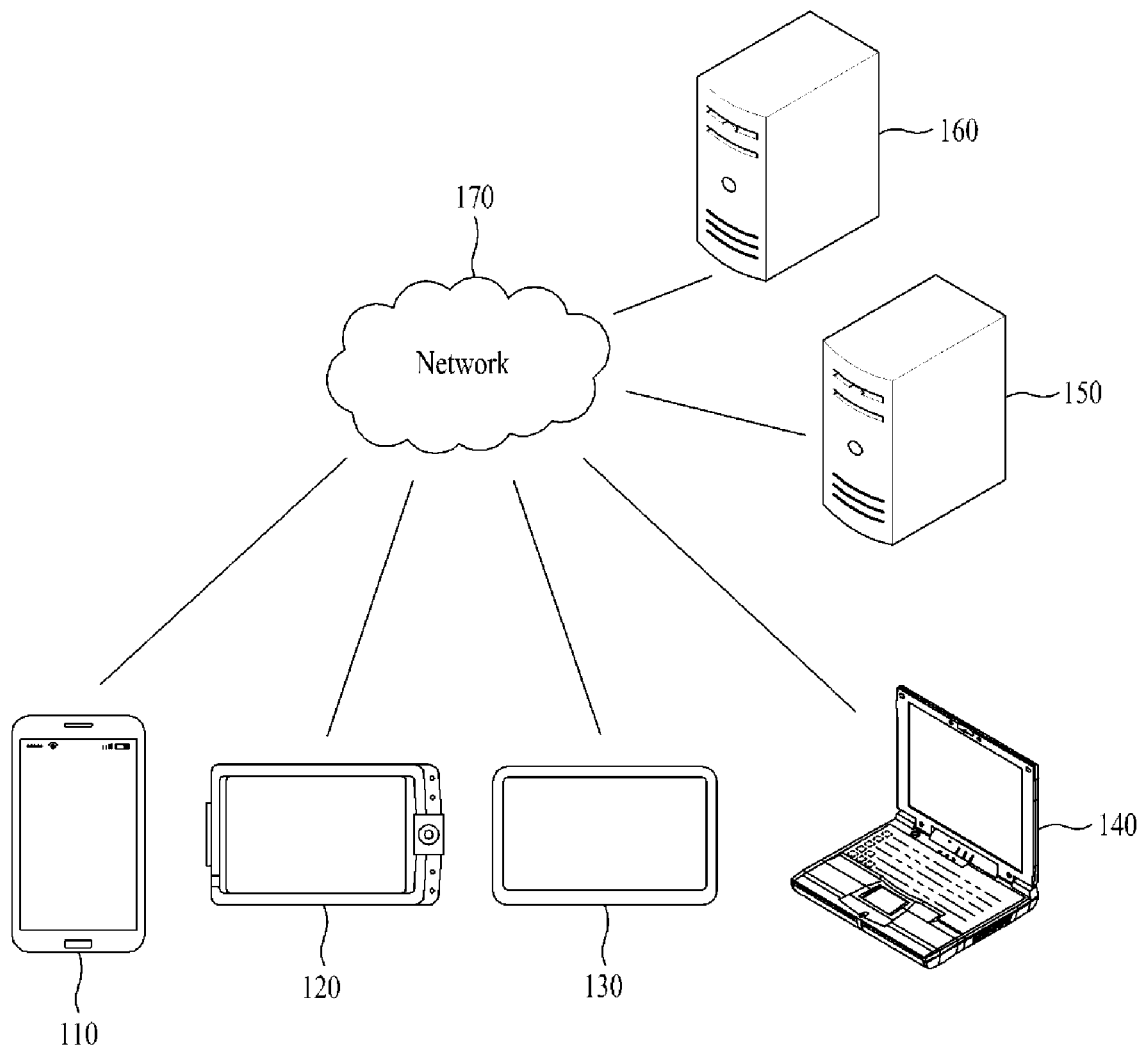
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

The drawings are not, however, to scale and may not precisely reflect the precise structural or performance characteristics of any given embodiment, and should not be interpreted as defining or limiting the range of values or properties encompassed by example embodiments.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments are described with reference to the accompanying drawings.

The example embodiments relate to technology for controlling joining a chatroom.

The example embodiments including the disclosures of the present specification may control joining a chatroom by providing a joinable chatroom using only a location without using a search function or a quick read (QR) code.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a stationary/fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, and the like, through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service (e.g., a messaging service, etc.) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
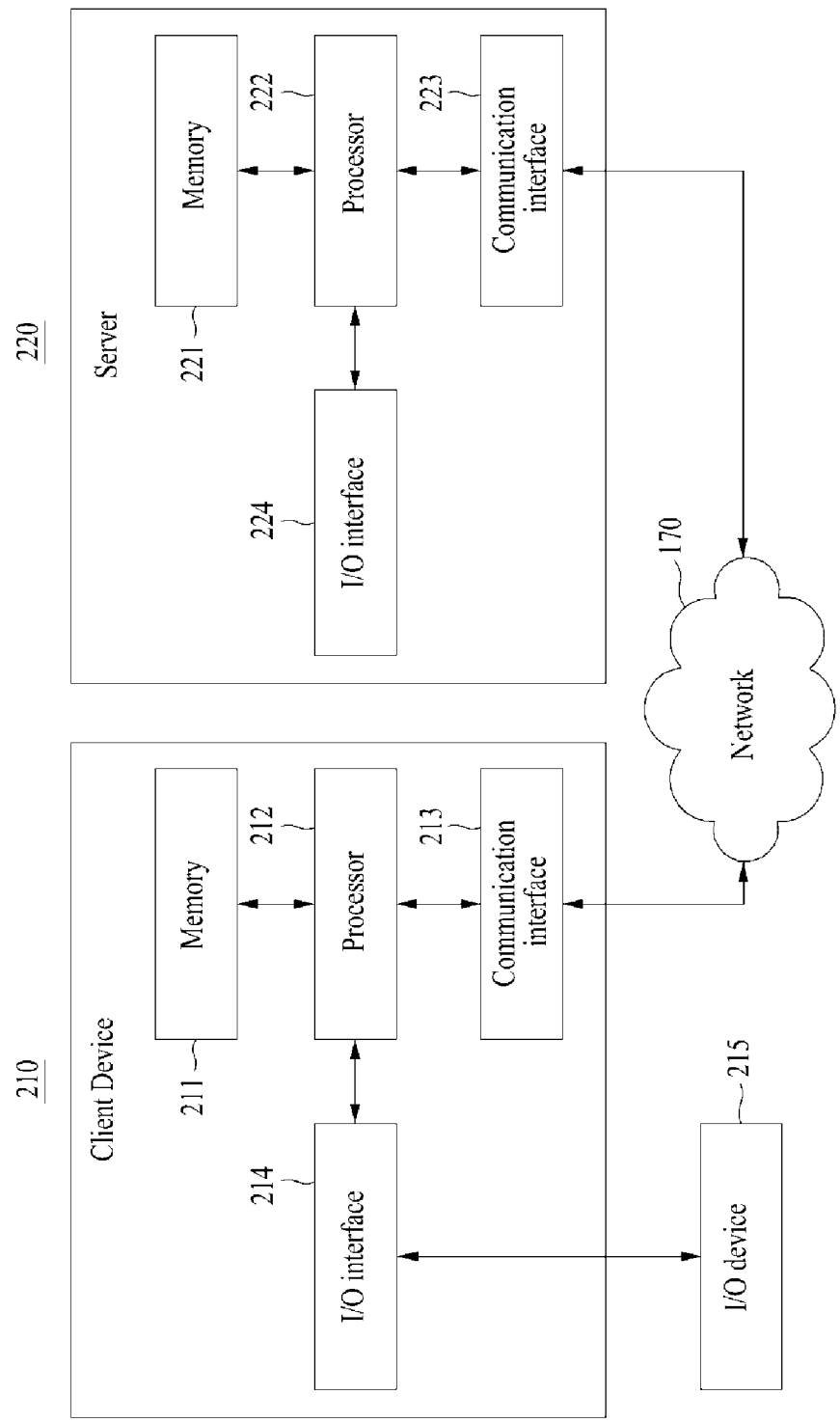
FIG. 2 is a diagram illustrating an example of an electronic device and a server according to at least one example embodiment.

FIG. 2 is a block diagram illustrating an example of a client device 210 and a server 220 according to at least one example embodiment. The client device 210 may correspond to any of the electronic devices 110, 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the client device 210 or the server 220 as a permanent storage device separate from the memory 211, 221. Also, an OS and at least one program code, for example, a code for a browser installed and executed on the client device 210 or an application installed and executed on the client device 210 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 220, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and/or the server 220 with another client device or server, and between the server 220 and another client device or server. For example, the processor 212 of the client device 210 may transfer a request created based on a program code stored in the storage device such as the memory 211, to the server 220 over the network 170 under control of the communication interface 213. The client device 210 may receive a control signal, an instruction, content, a file, etc., provided under control of the processor 222 of the server 220 through the communication interface 213 of the client device 210, from the communication interface 223 of the server 220. For example, a control signal, an instruction, content, a file, etc., of the server 220 received through the communication interface 213 may be transferred to the processor 212 or the memory 211, and content, a file, etc., may be stored in a storage medium, for example, the permanent storage device, further includable in the client device 210.

The I/O interface 214 may be a device used for interface with an I/O device 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O device 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 211, content or a service screen configured based on data provided from the server 220 or the electronic device 120 may be displayed on the display through the I/O interface 214.

According to other example embodiments, the client device 210 and the server 220 may include a smaller or greater number of components than a number of components shown in FIG. 2. However, there is no need to clearly illustrate many components according to the related art. For example, the client device 210 may include at least a portion of the I/O device 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, a method and system for controlling joining a chatroom based on a location according to example embodiments is described.

The term "chatroom" used herein refers to an interface screen of a chat function for sending and receiving messages between users in a messenger or a social network service (SNS), and particularly, a chatroom having an open chat function that enables a direct chat using a link, such as, a uniform resource link (URL), without performing a friend addition process using a telephone number and an identifier (ID).

Herein, the term "join" may refer to being granted a right to participate in a chatroom for an open chat.

A chat system configured as a computer may be configured in the client device 210 according to the example embodiment. For example, the chat system may be configured in a form of a program that independently operates or may be configured in an in-app form of a specific application to be operable on the specific application, and, depending on example embodiments, may provide a messaging service through interaction with the server 220.

A chat system configured as a computer may be provided in the client device 210. For example, the chat system may be configured as an independently operating program or in an in-app form of a specification to be operable on the specific application. Depending on example embodiments, the chat system may provide a messaging service through interaction with the server 220.

The chat system configured in the client device 210 in response to an instruction provided from an application installed on the client device 210 may perform methods including at least one feature associated with the example embodiments.

Hereinafter, an example embodiment of creating a chatroom for an open chat is described.

Figure 3:
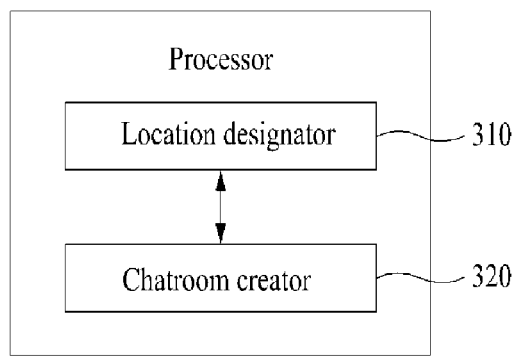
FIG. 3 is a diagram illustrating an example of components includable in a processor of an electronic device according to at least one example embodiment.
Figure 4:
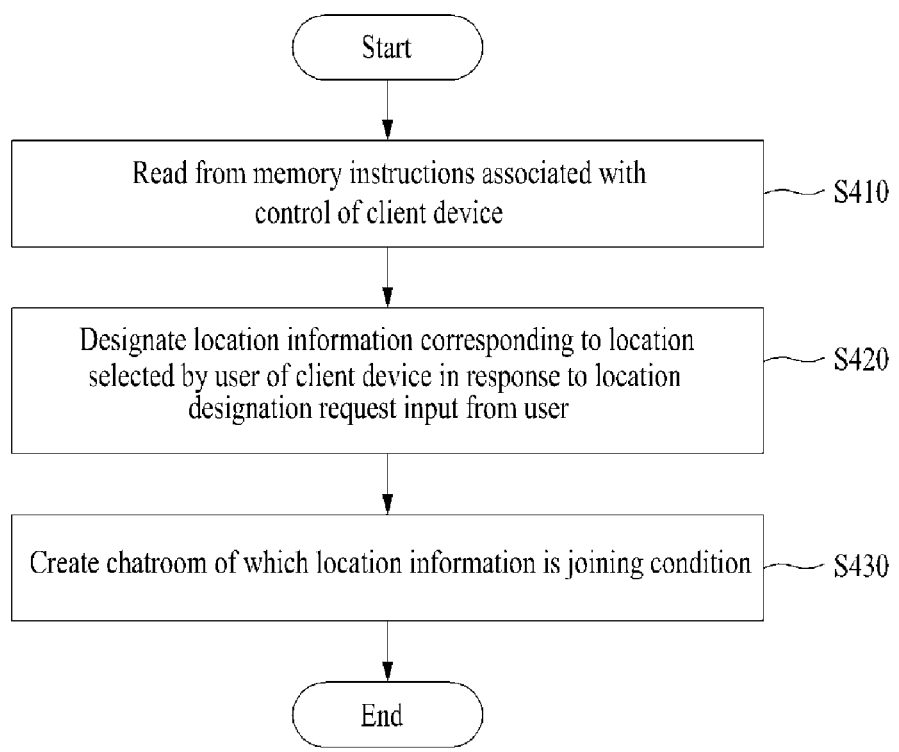
FIG. 4 is a flowchart illustrating an example of a chatroom creation method performed by an electronic device according to at least one example embodiment.

FIG. 3 is a diagram illustrating an example of components includable in a processor of a client device according to at least one example embodiment, and FIG. 4 is a flowchart illustrating an example of a chatroom creation method performed by a client device according to at least one example embodiment.

Referring to FIG. 3, to perform a chatroom creation method of FIG. 4, the processor 212 of the client device 210 may include a location designator 310 and a chatroom creator 320 as components of the processor 212. Depending on example embodiments, components of the processor 212 may be included in or excluded from the processor 212. Also, depending on example embodiments, components of the processor 212 may be separated or merged for functional representation of the processor 212.

The processor 212 and the components of the processor 212 may control the client device 210 to perform operations S410 to S430 included in the chatroom creation method of FIG. 4. For example, the processor 212 and the components of the processor 212 may be configured to execute a code of at least one program and a code of an OS included in the memory 211.

Here, the components of the processor 212 may be representations of different functions of the processor 212 performed by the processor 212 in response to an instruction (e.g., an instruction provided from an application executed on the client device 210), provided from a program code stored in the client device 210. For example, the location designator 310 may be used as a functional representation of the processor 212 to control the client device 210 to set up geographic location restrictions for an open chatroom in response to the instruction. In particular, the location designator 310 may designate a location only at which a user is allowed to access the open chatroom.

Referring to FIG. 4, in operation S410, the processor 212 may read from the memory 211 instructions associated with control of the client device 210. In particular, the read instruction may include an instruction for controlling the processor 212 to perform the following operations S420 and S430.

In operation S420, in the case of creating a chatroom for an open chat through a messenger installed on the client device 210, the location designator 310 may designate an accessible location (e.g., latitudinal and longitudinal coordinates, a physical address, Internal Protocol (IP) addresses indicating geographic locations, etc.) based on a location selected by a user of the client device 210 in response to a location designation request from the user of the client device 210. For example, the location designator 310 may provide a map-based location search function or an address-based location search function in response to the location designation request from the user, and may designate the accessible location to include a specific location selected by the user through such a location search function. Here, the user may select a location based on a point of interest (POI) through a map or address search or based on a predetermined region range such as an administrative district, a neighborhood, a county, a city, a state, a country, and the like. The location designator 310 may set the access denied location to all the locations other than the designated access approved location.

In operation S430, in response to a chatroom creation request input from the user of the client device 210, the chatroom creator 320 may create a chatroom that includes the designated accessible location as a joining condition. That is, the chatroom creator 320 may create a chatroom in response to a chatroom creation request input from the user and may set a location of the client device 210 as a joining condition for the chatroom. Here, the chatroom may be accessible through a link without adding a friend and the chatroom creator 320 may create an open chat link in a form sharable through a messenger or various types of web services in response to the chatroom creation request input from the user. The open chat link may include a function of executing a chatroom of a corresponding link to enable a chat in such a manner that a messenger is executed in response to a click on the link. In a general open chatroom, any user may join at any time without any restrictions. On the other hand, the example embodiment may control joining a chatroom based on a location by designating and thereby limiting a joining condition of the chatroom based on location information.

Figure 5:
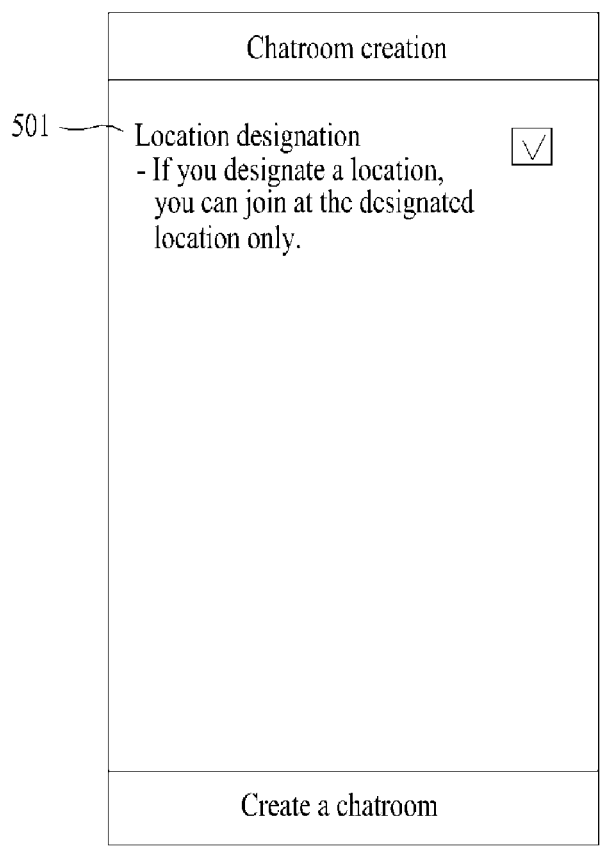
FIGS. 5 and 6 illustrate examples of a process of creating a chatroom according to at least one example embodiment.
Figure 6:
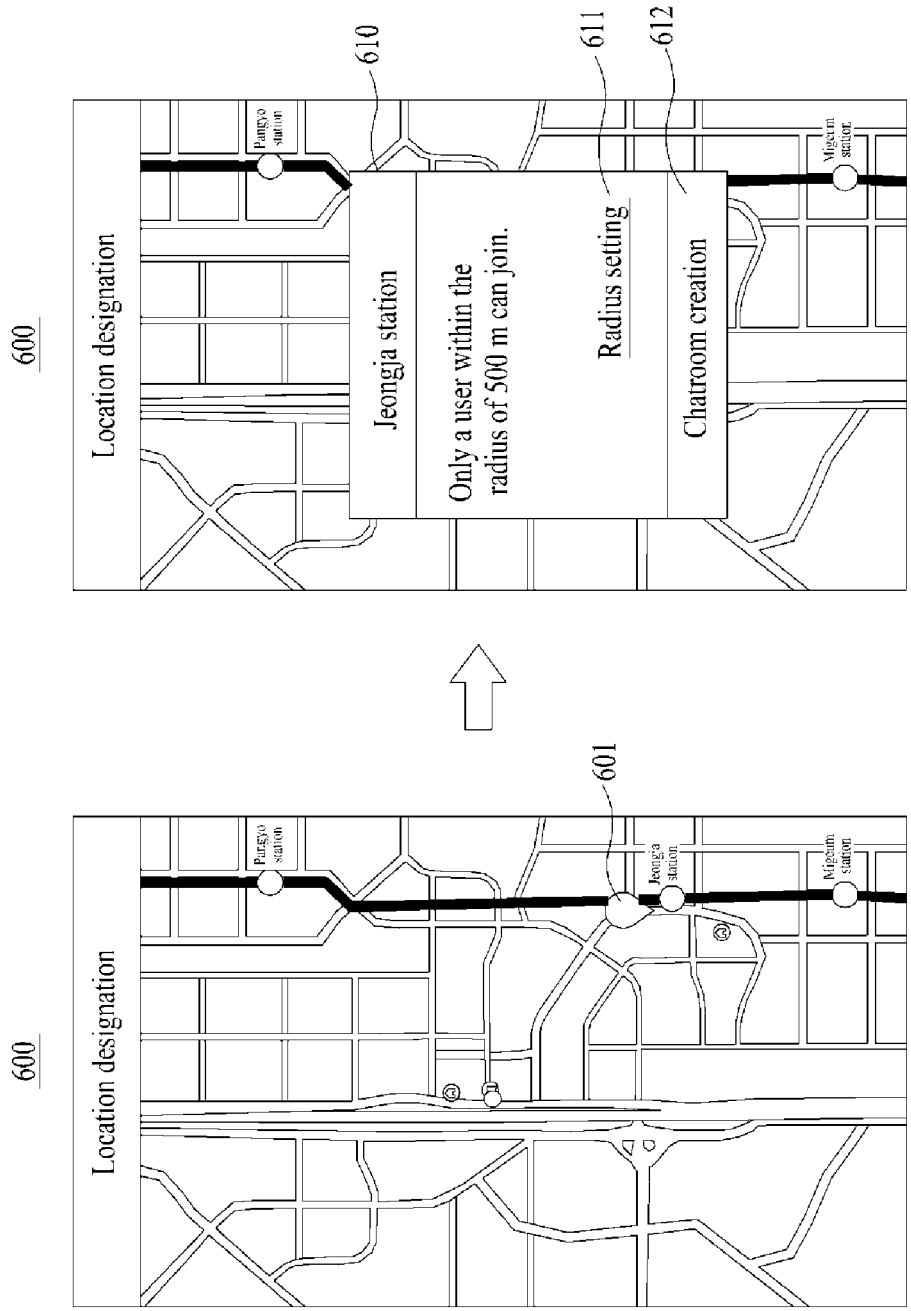

FIGS. 5 and 6 illustrate examples of a process of creating a chatroom according to at least one example embodiment.

Referring to FIG. 5, the processor 212 may provide a chatroom creation screen 500 for creating an open chatroom in response to a user request through a menu included in a messenger. The chatroom creation screen 500 may include a "location designation" menu 501 for designating a location as a joining condition for a chatroom. The user may selectively set a location designation status of a chatroom the user desires to designate using the "location designation" menu 501.

If the user requests a location designation through the "location designation" menu 501 prior to requesting a chatroom creation on the chatroom creation screen 500, the processor 212 may provide a location designation screen 600 of FIG. 6. For example, the location designation screen 600 may include a location search function using a map. The user may designate a location of a chatroom the user desires to create by selecting a specific POI or a specific region on the map displayed on the location designation screen 600. For a location designation, a POI search or an address search may be provided in addition to a location search using the map.

If the user selects a specific location 601 through the location designation screen 600, the processor 212 may provide a confirmation screen 610 for confirming the selected specific location 601. In the case of designating the specific location 601 as a POI, location information may be designated by including a radius range determined as a default based on the specific location 601. The confirmation screen 610 may include information about the specific location 601, a "radius setting" menu 611 for setting a radius range and a "chatroom creation" menu 612 for requesting creation of a chatroom.

If the user designates the specific location 601 and then selects the "chatroom creation" menu 612 through the location designation screen 600, the processor 212 may create a chatroom of which location information including the specific location 601 is designated as a joining condition. Here, the processor 212 may forward information about the chatroom to the server 220 to be registered on an open chat platform. Information about the chatroom may include an open chat link of the chatroom, location information designated as the joining condition, information of a user (e.g., an administrator, a chatroom host, etc.) that creates the chatroom, and the like.

According to example embodiments, an open chatroom may be created by designating location information as a joining condition. That is, an open chatroom including a geofencing or location-based join gate may be created.

Hereinafter, an example embodiment of controlling joining an open chatroom based on a location is described.

Figure 7:
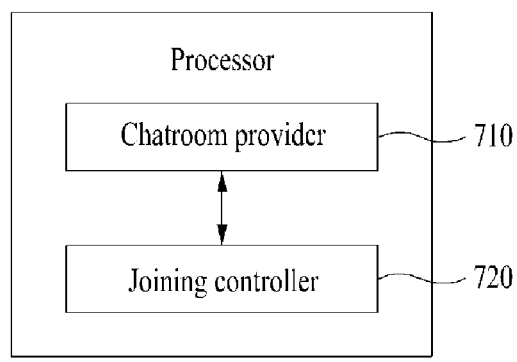
FIG. 7 is a diagram illustrating another example of components includable in a processor of an electronic device according to at least one example embodiment.
Figure 8:
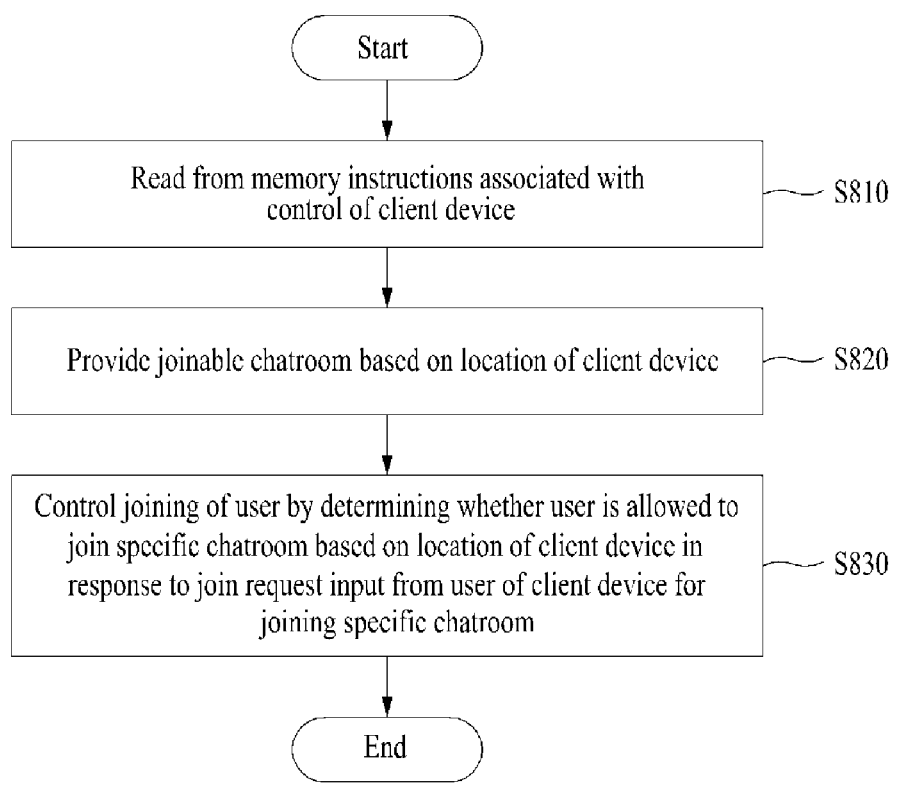
FIG. 8 is a flowchart illustrating an example of a chatroom joining control method performed by an electronic device according to at least one example embodiment.

FIG. 7 is a diagram illustrating another example of components includable in a processor of a client device according to at least one example embodiment, and FIG. 8 is a flowchart illustrating an example of a chatroom joining control method performed by a client device according to at least one example embodiment.

Referring to FIG. 7, to perform the chatroom joining control method of FIG. 8, the processor 212 of the client device 210 may include a chatroom provider 710 and a joining controller 720 as components of the processor 212. The components of the processor 212 may be selectively included in or excluded from the processor 212. Also, depending on example embodiments, the components of the processor 212 may be separated or merged for functional representation of the processor 212. Although the chatroom provider 710 and the joining controller 720 may be configured as a single system through merge with the components of the processor 212, a component involved with a chatroom creation and a component involved with a chatroom joining are separately illustrated for clarity of description.

The processor 212 and the components of the processor 212 may control the client device 210 to perform operations S810 to S830 included in the chatroom joining control method of FIG. 8. For example, the processor 212 and the components of the processor 212 may be configured to execute an instruction according to a code of at least one program and a code of an OS included in the memory 211.

Referring to FIG. 8, in operation S810, the processor 212 may read from the memory 211 instructions associated with control of the client device 210. In particular, the read instruction may include an instruction for controlling the processor 212 to perform the following operations S820 and S830.

In operation S820, the chatroom provider 710 may provide a chatroom that allows a user of the client device 210 to join based on a location of the client device 210. The chatroom provider 710 may receive information about a chatroom that allows the user to join based on a location of the client device 210 among chatrooms registered to an open chat platform through interaction with the server 220 and may display the received information on a screen of the client device 210. For example, the chatroom provider 710 may display joinable chatrooms in a form of a list based on a location of the client device 210. As another example, the chatroom provider 710 may display an icon of a joinable chatroom in an overlay form on a map that includes a location of the client device 210.

The chatroom provider 710 may determine a chatroom that allows the user of the client device 210 to join by comparing the location of the client device 210 and an accessible location designated for each chatroom and may determine an icon type of a chatroom displayed on a map based on a location comparison result. With respect to an icon of an open chatroom displayed on the map, an icon type, for example, an icon shape or an icon color may be differently displayed based on a distance from the user. Here, the chatroom provider 710 may determine the icon type depending on whether the accessible location designated for the chatroom is within a predetermined or preset distance from the location of the client device 210. That is, if the location of the client device 210 is within the distance from the accessible location designated for the chatroom, the chatroom provider 710 may change an icon type or an icon color of the corresponding chatroom and thereby display the chatroom with the changed icon type or icon color. For example, the chatroom provider 710 may display a chatroom present within a predetermined or preset distance from the user of the client device 210 using a blue icon and may display a chatroom outside the distance from the user using a red icon. The chatroom provider 710 may display the "red" icon if a location of the client device 210 is outside the predetermined distance from the accessible location designated for the chatroom and then change an icon color of the corresponding chatroom from "red" to "blue" if the location of the client device 210 becomes within the predetermined distance from the designated accessible location.

The chatroom provider 710 may receive an input of a POI for recommending an open chatroom from the user of the client device 210. If the user is currently present in the input POI based on a location of the client device 210, the chatroom provider 710 may display a chatroom of which location information designated as a joining condition corresponds to the POI of the user as a chatroom that allows the user to join. That is, if a current location of the client device 210 corresponds to the POI of the user, the chatroom provider 710 may provide the user with a notification about a chatroom of which a joining condition is met by the POI of the user. Also, an administrator or host of the chatroom may push an invite message associated with the chatroom to a user who predesignates a POI. The administrator or host of the chatroom may set a push notification range at a time of creating the chatroom and may push an invite message for inducing joining the chatroom in response to an actual visit of a user that designates a region included in the push notification range as a POI. Also, when creating the chatroom, the administrator or host may designate an accessible location and a keyword together as a joining condition for the chatroom. Here, in response to a keyword input from the user of the client device 210 for search, the chatroom provider 710 may provide a location of the client device 210 at a point in time of the search and a chatroom that matches the input keyword as a joinable chatroom.

In operation S830, in response to a join request input from the user of the client device 210 for joining a specific chatroom among chatrooms displayed on the screen of the client device 210, the joining controller 720 may control joining of the user by determining whether the user is allowed to join the specific chatroom based on a current location of the client device 210. For example, if a location of the client device 210 at a point in time at which the join request is input is outside a predetermined or preset distance from an accessible location designated for a chatroom requested by the user to join, the joining controller 720 may determine that the user is not allowed to join the chatroom and may output a reject message indicating the join request. On the contrary, if the location of the client device 210 at the point in time at which the join request is input is within the distance from the accessible location designated for the chatroom, the joining controller 720 may determine that the user is allowed to join the chatroom and may forward the join request to the server 220. As another example, an accessible location designated for a chatroom may correspond to a location range that is set up by the user as a joining condition at a time of creating the chatroom. In this example, if a location of the client device 210 at a point in time at which the join request is input does not correspond to the designated accessible location, the joining controller 720 may determine that the user is disallowed to join the chatroom and may output a message rejecting the join request. On the contrary, if the location of the client device 210 at the point in time at which the join request is input corresponds to the designated accessible location, the joining controller 720 may determine that the user is allowed to join. If it is determined that the user is allowed to join, the joining controller 720 may immediately perform a join approval process for the specific chatroom. Depending on example embodiments, the joining controller 720 may forward the join request of the user to the administrator and may receive an approval from the administrator.

In an example embodiment, even when an accessible location is designated for a chatroom, a host user who creates the chatroom may be allowed to access the chatroom regardless of the location of the user (e.g., the location of the client device 210) while other uses may be allowed to join the chatroom only when their locations satisfy the joining condition. The joining controller 720 may determine whether the user of the client device 210 is a host user, before determining whether to allow or disallow the user to join the chatroom based on the location of the client device 210.

The joining controller 720 may determine whether to remove the user from the chatroom based on a (approval) withdrawal condition or a location-based user removal condition that is preset for the chatroom joined by the user of the client device 210. For example, the joining controller 720 may determine to allow the user to withdraw the approval for joining the chatroom at a point in time at which a period set as the withdrawal condition of the chatroom elapses after the user of the client device 210 joins the chatroom. As another example, the joining controller 720 may track a location of the client device 210 and may determine to allow the user to remove from the chatroom if a result of the tracking meets the withdrawal condition. For example, if there is no history that a user location was within a preset distance range from an accessible location designated for the chatroom for a predetermined or preset period of time, or if a user location at a time of accessing the chatroom is a location irrelevant to a location designated for the chatroom a preset number of times or more, the joining controller 720 may determine removal of the user. The joining controller 720 may forward user information of the user whose removal is determined, to the server 220. Here, the joining controller 720 may remove the user who is determined to meet the withdrawal condition, from the chatroom and, depending on example embodiments, may forward information of the user that is a withdrawal target to the administrator or host such that the administrator or host may process the user removal.

Figure 9:
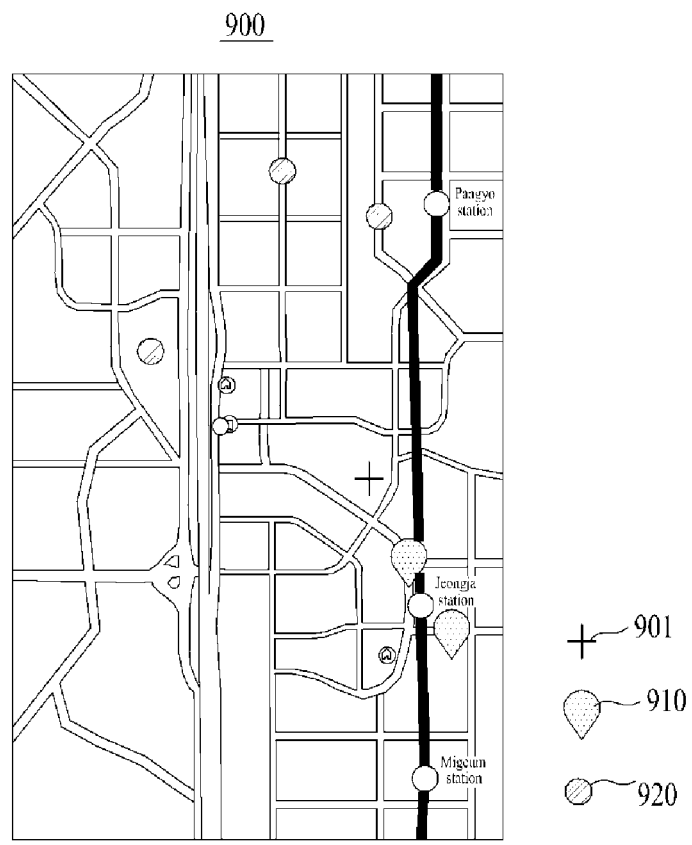
FIGS. 9 to 11 illustrate examples of an interface screen for displaying a joinable chatroom according to at least one example embodiment.
Figure 10:
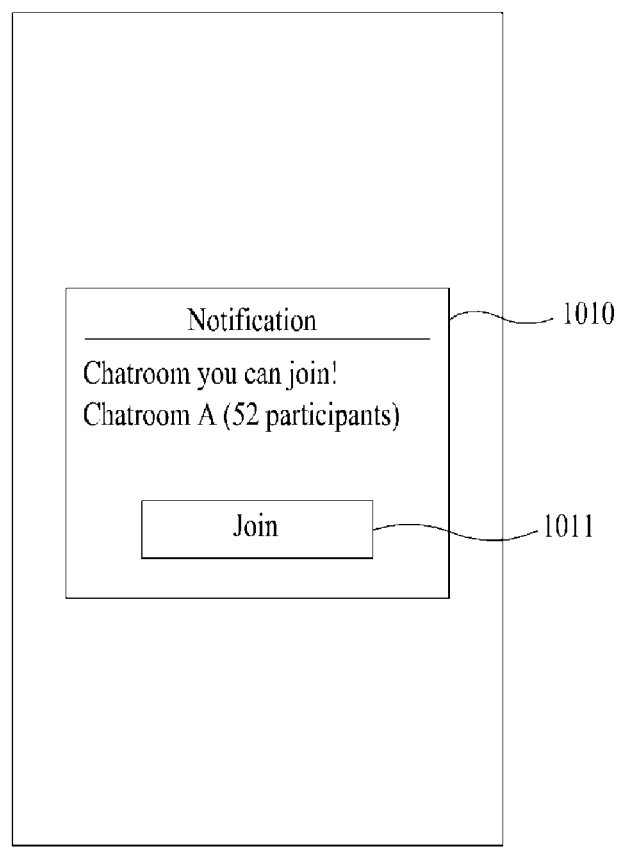
Figure 11:
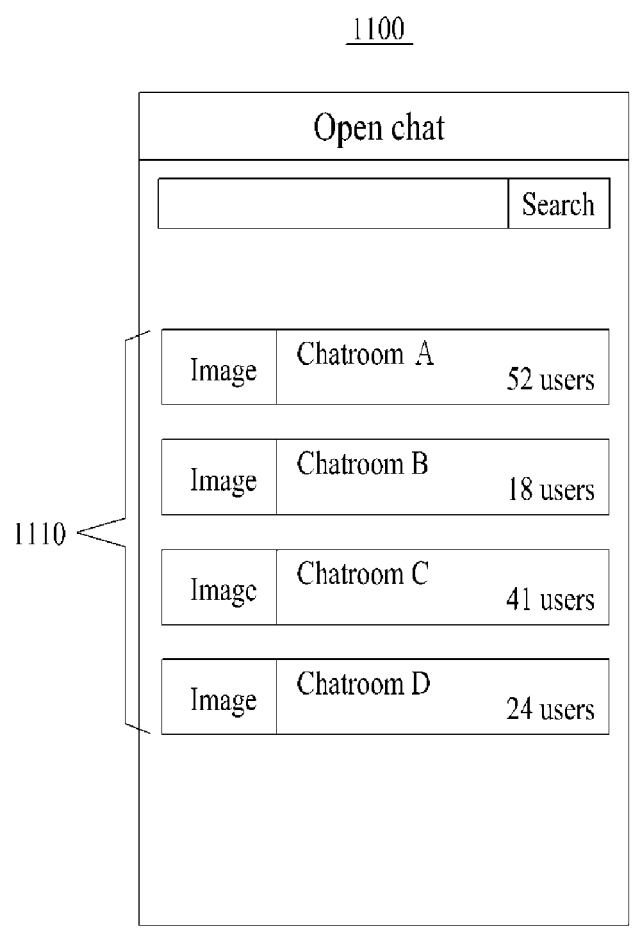

FIGS. 9 to 11 illustrate examples of an interface screen for displaying a joinable chatroom according to at least one example embodiment; and For example, referring to FIG. 9, the processor 212 may display icons 910 and 920 representing joinable chatrooms to be overlaid on a map screen 900 that includes a current location 901 of the client device 210. Here, the processor 212 may differently display icon shapes or colors to distinguish the icon 910 of the chatroom of which location information designated as a joining condition is within a predetermined or preset distance from the current location 901 of the client device 210 and the icon 920 of the chatroom of which the designated accessible location is outside the distance from the current location 901 of the client device 210.

As another example, referring to FIG. 10, the processor 212 may provide a notification about at least one joinable chatroom based on a location of the client device 210. For example, the processor 212 may display a notification screen 1010 about a chatroom of which location information designated as a joining condition is closest based on the current location 901 of the client device 210 on a screen 1000 of the client device 210. A join request interface 1011 for requesting joining a chatroom may be included on the notification screen 1010. Depending on example embodiments, the processor 212 may provide a desired (or, alternatively, predetermined) number of chatrooms in a form of a list in which the chatrooms are sorted in order closest to the current location 901 of the client device 210 through the notification screen 1010.

As another example, referring to FIG. 11, the processor 212 may display a list of joinable chatrooms based on a location of the client device 210 on a main screen 1100 associated with an open chat among interface screens of a messenger. The main screen 1100 may include a plurality of regions for recommending open chatrooms based on a variety of criteria and may include a separate region for recommending a chatroom of which location information is designated as a joining condition.

When providing joinable chatrooms based on the location of the client device 210, a number of chatrooms to be provided may exceed a predetermined maximum number. In this case, the processor 212 may provide a predetermined number of chatrooms in order of distances from the location of the client device 210 or may provide a chatroom selected at the server 220 based on a weight according to an activity score of each chatroom through interaction with the server 220. For example, the processor 212 may calculate an activity score of each chatroom based on a number of users participating in a corresponding chatroom, a number of messages exchanged between users during a unit time, and a feedback value of content included in the corresponding chatroom, may apply the weight according to the activity score, and may select the chatroom to be provided to the user of the client device 210.

FIG. 12 illustrates an example of a process of joining a chatroom according to at least one example embodiment.

The processor 212 may display information about joinable chatrooms on a screen of the client device 210 based on a location of the client device 210 using a variety of routes. Here, referring to FIG. 12, in response to a selection on a single specific chatroom among the chatrooms displayed on the screen from the user of the client device 210, the processor 212 may provide an introduction screen 1200 of the selected specific chatroom. The introduction screen 1200 may include, for example, a name, a tag, administrator information, and a number of participants of the selected chatroom, and may include a join request interface 1201 for inputting a join request.

The processor 212 may determine that the user of the client device 210 is allowed to join the chatroom at a point in time at which the user inputs the join request interface 1201 on the introduction screen 1200. Therefore, once a join approval process is completed, the introduction screen may be switched to a chatroom screen 1210 in which the user is allowed to participate.

According to example embodiments, it is possible to create an open chatroom by designating location information as a joining condition and to control the user to join the open chatroom based on a location of the user. Therefore, it is possible to support joining a chatroom by providing a joinable chatroom based on a location only instead of using a separate search function or a QR code.

The systems or the apparatuses described herein may be implemented using hardware components, software components, and/or a combination thereof. For example, a processing device may be implemented using one or more general-purpose or special purpose computers, such as, for example, a processor, a controller, an arithmetic logic unit, a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling a chatroom access, the method comprising:
   identifying a first location of an electronic device at a first point in time;
   displaying a chatroom that uses a user location as a chatroom joining condition, and that allows a user of the electronic device to join the chatroom based on the first location of the electronic device; and
   in response to a join request being input at a second point in time from the user to join the displayed chatroom, determining whether to allow the user to join the chatroom based on a second location of the electronic device at the second point in time at which the join request is input,
   wherein the displaying the chatroom comprises displaying, on a map, the first location of the electronic device and an icon of the chatroom that allows the user to join, at an accessible location designated for the chatroom, and
   wherein the chatroom is one of a plurality of chatrooms, and the displaying the chatroom comprises displaying the plurality of chatrooms based on a weight assigned to each of the plurality of chatrooms according to an activity score of each of the plurality of chatrooms through interaction with a server, the activity score being calculated based on a number of participants in each of the plurality of chatrooms, and a number of messages exchanged during a unit time in each of the plurality of chatrooms.

2. The method of claim 1, further comprising setting the chatroom joining condition based on a user input for setting a region of interest,
   wherein the icon of the chatroom that allows the user to join is within the region of interest, and the method further comprises displaying an icon of a chatroom that is outside the region of interest on the map, using a color or a shape that is different from the icon of the chatroom within the region of interest.

3. The method of claim 1, wherein the chatroom is an open chatroom accessible through a link.

4. The method of claim 1, wherein the displaying the chatroom comprises determining the chatroom that allows the user to join by comparing the accessible location designated for the chatroom, with the first location of the electronic device.

5. The method of claim 1,
   wherein the displaying the chatroom comprises displaying the plurality of chatrooms that allows the user to join, in an order of distance from the first location of the electronic device to accessible locations designated for the plurality of chatrooms, and
   wherein each of the plurality of chatrooms is displayed together with a number of participants of each of the plurality of chatrooms.

6. The method of claim 1,
   wherein the displaying the chatroom comprises displaying, on the map, the first location of the electronic device, and icons of the plurality of chatrooms that allow the user to join based on the first location of the electronic device.

7. The method of claim 6, wherein the chatroom joining condition is satisfied when the electronic device is located within a predetermined distance from the accessible location that is designated for the chatroom, and
   wherein the displaying the chatroom comprises:
      displaying the icon of the chatroom as a first icon type on the map when the electronic device is located within the predetermined distance from the accessible location designated for the chatroom; and
      displaying the chatroom as a second icon type that is different from the first icon type, on the map, when the electronic device is located outside the predetermined distance from the accessible location designated for the chatroom.

8. The method of claim 1, wherein the determining whether to allow the user to join the chatroom comprises:
   determining to allow the user to join the chatroom, in response to determining that the second location of the electronic device at the second point in time at which the join request is input is within a predetermined distance from the accessible location that is designated for the chatroom as the chatroom joining condition; and determining to disallow the user to join the chatroom, in response to determining that the second location is outside the predetermined distance from the accessible location that is designated for the chatroom.

9. The method of claim 1, further comprising, in response to determining that the first location of the electronic device changes to the second location different from the first location, determining whether to remove the user from the chatroom based on the second location of the electronic device and a location-based user removal condition that is preset for the chatroom.

10. The method of claim 9, wherein the determining whether to allow the user to join the chatroom comprises:

allowing the user to join the chatroom based on the second location of the electronic device at the second point in time at which the join request is input;

tracking a current location of the electronic device after the user joins the chatroom; and determining to remove the user from the chatroom in response to a result of the tracking satisfying the location-based user removal condition.

11. A non-transitory computer-readable record medium storing instructions that are executable by a processor, to cause the processor to perform the method of claim 1.

12. A computer system comprising:

at least one memory configured to store computer-readable instructions; and at least one processor configured to execute the computer-readable instructions stored in the at least one memory, to:

identify a first location of the computer system at a first point in time;

display a chatroom that uses a user location as a chatroom joining condition and allows a user of the computer system to join based on the first location of the computer system; and in response to a join request being input from the user, at a second point in time, to join the displayed chatroom, determine whether to allow the user to join the chatroom based on a second location of the computer system at the second point in time at which the join request is input, wherein the least one processor is configured to:

control a map to display, on the map, the first location of the computer system, and an icon of the chatroom at an accessible location designated for the chatroom; and when the chatroom is one of a plurality of chatrooms, display the plurality of chatrooms based on a weight assigned to each of the plurality of chatrooms according to an activity score of each of the plurality of chatrooms through interaction with a server, the activity score being calculated based on a number of participants in each of the plurality of chatrooms, and a number of messages exchanged during a unit time in each of the plurality of chatrooms.

13. The computer system of claim 12, wherein the at least one processor is further configured to execute the computer-readable instructions to:

set the chatroom joining condition based on a user input for setting a region of interest (ROI), wherein the icon of the chatroom that allows the user to join is within the ROI, and an icon of a chatroom that is outside the ROI on the map, is displayed using a color or a shape that is different from the icon of the chatroom within the ROI.

14. The computer system of claim 12, wherein the chatroom is an open chatroom accessible through a link.

15. The computer system of claim 12, wherein the at least one processor is further configured to execute the computer-readable instructions to:

determine the chatroom that allows the user to join by comparing the accessible location designated for the chatroom, with the first location of the computer system.

16. The computer system of claim 12, wherein the at least one processor is further configured to execute the computer-readable instructions to:

display, on the map, the first location of the computer system, and icons of the plurality of chatrooms that allow the user to join based on the first location of the computer system.

17. The computer system of claim 16, wherein the chatroom joining condition is satisfied when the computer system is located within a predetermined distance from the accessible location that is designated for the chatroom, and wherein the at least one processor is further configured to execute the computer-readable instructions to:

display the icon of the chatroom as a first icon type on the map when the computer system is located within the predetermined distance from the accessible location designated for the chatroom; and display the chatroom as a second icon type that is different from the first icon type, on the map, when the computer system is located outside the predetermined distance from the accessible location designated for the chatroom.

18. The computer system of claim 12, wherein the at least one processor is further configured to execute the computer-readable instructions to:

determine to allow the user to join the chatroom, in response to determining that the second location of the computer system at the second point in time at which the join request is input is within a predetermined distance from the accessible location that is designated for the chatroom as the chatroom joining condition; and determine to disallow the user to join the chatroom, in response to determining that the second location is outside the predetermined distance from the accessible location that is designated for the chatroom.

19. The computer system of claim 12, wherein the at least one processor is further configured to execute the computer-readable instructions to:

allow the user to join the chatroom based on the second location of the computer system at the second point in time at which the join request is input;

track a current location of the computer system after the user joins the chatroom; and determine whether to remove the user from the chatroom, in response to a result of tracking the current location of the computer system satisfying a location-based user withdrawal condition that is preset for the chatroom.

* * * * *